US012265365B2

(12) United States Patent
Shin (10) Patent No.: US 12,265,365 B2
(45) Date of Patent: Apr. 1, 2025

(54) METHOD AND SYSTEM FOR CONTROLLING A VEHICLE

(71) Applicants: HYUNDAI MOTOR COMPANY, Seoul (KR); KIA CORPORATION, Seoul (KR)

(72) Inventor: Yongwoo Shin, Hwaseong-si (KR)

(73) Assignees: HYUNDAI MOTOR COMPANY, Seoul (KR); KIA CORPORATION, Seoul (KR)

(*) Notice: Subject to any disclaimer, the term of this patent is extended or adjusted under 35 U.S.C. 154(b) by 77 days.

(21) Appl. No.: 17/470,885

(22) Filed: Sep. 9, 2021

(65) Prior Publication Data

US 2022/0137572 A1 May 5, 2022

(30) Foreign Application Priority Data

Nov. 3, 2020 (KR) .................. 10-2020-0144955

(51) Int. Cl.
| | |
|---|---|
| *G05B 15/02* | (2006.01) |
| *B60Q 9/00* | (2006.01) |
| *H04L 67/12* | (2022.01) |
| *G16Y 10/80* | (2020.01) |
| *G16Y 30/00* | (2020.01) |

(52) U.S. Cl.
CPC .............. *G05B 15/02* (2013.01); *B60Q 9/00* (2013.01); *H04L 67/12* (2013.01); *G16Y 10/80* (2020.01); *G16Y 30/00* (2020.01)

(58) Field of Classification Search
CPC ........... G05B 15/02; B60Q 9/00; H04L 67/12; H04L 67/125; H04L 12/2818; H04L 12/2825; H04L 67/75; G16Y 10/80; G16Y 30/00; G16Y 40/35; H04W 4/44; H04W 4/70; B60W 50/14; B60W 2050/146; B60W 2556/45
USPC ......................................................... 700/205
See application file for complete search history.

(56) References Cited

U.S. PATENT DOCUMENTS

| | | | |
|---|---|---|---|
| 2018/0338241 A1* | 11/2018 | Li | H04W 4/40 |
| 2020/0159251 A1* | 5/2020 | Iwasaki | G08G 1/202 |
| 2021/0044737 A1* | 2/2021 | Kang | H04L 65/1073 |

* cited by examiner

*Primary Examiner* — Mohammad Ali
*Assistant Examiner* — Saad M Kabir
(74) *Attorney, Agent, or Firm* — Lempia Summerfield Katz LLC (57) ABSTRACT

A method and system for controlling a vehicle shorten waiting time for a user to receive a result of a command when implementing a Car-to-Home service that communicates through servers. The method includes: inquiring, through a first server, a current state of an Internet of Things (IoT) device linked to enable remote control from a vehicle and storing the inquired IoT device current state; upon generation of the request from the vehicle, fetching information about the current state of the IoT stored in the first server and displaying the information through a display; re-inquiring the current state to update the information about the current state of the IoT stored in the first server; and if the information about the current state of the displayed IoT does not match the information about the updated current state in the first server, displaying the updated information about the IoT current state through the display.

28 Claims, 4 Drawing Sheets

FIG. 4

METHOD AND SYSTEM FOR CONTROLLING A VEHICLE

CROSS-REFERENCE TO RELATED APPLICATION

This application is based on and claims priority under 35 U.S.C. § 119 to Korean Patent Application No. 10-2020-0144955, filed on Nov. 3, 2020 in the Korean Intellectual Property Office, the disclosure of which is incorporated herein by reference.

BACKGROUND

1. Field

The present disclosure relates to a vehicle and a method and a system for controlling a vehicle for implementing a Car-to-Home service that enables Internet of Things (IoT) devices at a remote side to be controlled from a vehicle.

2. Description of the Related Art

Research is being conducted on 'Car-to-Home service' based on Internet of Things (IoT) that enables users to operate lighting or heating devices connected to the Internet through a head unit of a vehicle.

In the Car-to-Home service, the IoT device communicates with the head unit of the vehicle through a plurality of servers. In other words, through the plurality of servers, the IoT devices are connected to an IoT application and transmit data to the IoT application or receive a command (a control request) from the IoT application to control actuators, such as lighting or heating devices, in the home. The IoT application is installed on the head unit of the vehicle and is manipulated by a user (a driver).

As described above, since communication between the head unit of the vehicle and the remote IoT device is performed through a plurality of servers, transmission of information takes a long time, which causes the waiting time of the user (the driver) to increase until the user checks a result of the command (the request) generated from the head unit of the vehicle. Thus, the user may feel uncomfortable.

SUMMARY

The present disclosure provides, when implementing a Car-to-Home service that performs communication through a plurality of servers, shortening the waiting time taken for a user to receive a result of a command (a request).

Additional aspects of the disclosure are set forth in part in the following description and, in part, should be apparent from the description, or may be learned by practice of the disclosure.

According to an aspect of the disclosure, a method of controlling a vehicle is provided. The method includes inquiring, through a first server, a current state of an Internet of Things (IoT) device that is linked to enable remote control from a vehicle and storing the inquired current state of the IOT device. The method also includes, upon generation of a request for inquiring the current state of the IOT device from the vehicle, fetching information about the current state of the IoT stored in the first server and displaying the fetched information about the current state of the IoT through a display. The method also includes re-inquiring the current state of the IoT to update the information about the current state of the IoT stored in the first server. The method also includes upon the information about the current state of the IoT displayed through the display not matching the information about the current state of the IoT device updated in the first server, displaying the information about the current state of the IoT device updated in the first server through the display.

The first server may be a server operated by a manufacturer of the vehicle to enable the IoT device at a remote site to be controlled from the vehicle.

The first server may communicate with the IoT device through a second server and a third server.

The second server may be a server operated by an IoT service company to provide an IoT service through the IoT device and the third server may be a server operated by a manufacturer of the IoT device to provide content related to the IoT.

The request for inquiring the current state of the IoT device may be transmitted through the first server and the second server to the third server so that the inquiring of the current state of the IoT device is performed. A result of inquiring the current state of the IoT device may be transmitted through the third server and the second server to the first server and is stored in the first server.

According to another aspect of the disclosure, a method of controlling a vehicle is provided. The method includes, in response to generation of a command for remotely controlling an Internet of Things (IoT) device located at a remote site from a vehicle, transmitting the command through a first server to a second server. The method also includes, in response to success of the transmission of the command from the first server to the second server, assuming that the command has been executed based on the success of the transmission of the command before checking a result of executing the command in practice in the IoT device and displaying that the command has been executed on a display of the vehicle in advance. The method also includes transmitting, by the second server, the command to the IoT device and receiving a result of executing the command in the IoT device. The method also includes, in response to the command having not been executed in the IoT device, correctively indicating that the command has not been executed and displaying the corrected result on the display of the vehicle.

The first server may be a server operated by a manufacturer of the vehicle to enable the IoT device at a remote site to be controlled from the vehicle.

The first server may communicate with the IoT device through the second server and the third server.

The second server may be a server operated by an IoT service company to provide an IoT service through the IoT device and the third server may be a server operated by a manufacturer of the IoT device to provide content related to the IoT.

The command may be transmitted through the first server and the second server to the third server such that control corresponding to the command is performed. A result of executing the command in the IOT device may be transmitted to the vehicle through the third server, the second server, and the first server.

According to another aspect of the disclosure, a system of controlling a vehicle is provided. The system includes a head unit configured to perform a remote control on an Internet of Things (IoT) device at a remote site from a vehicle. The system also includes a display configured to display a user interface and information related to the remote control of the IoT device. The head unit is configured to inquire, through a first server, a current state of the IoT device that is linked to enable remote control from the vehicle and store the inquired current state of the IOT device. The head unit is also configured to, upon generation of a request for inquiring the current state of the IOT device from the vehicle, fetch information about the current state of the IoT stored in the first server and display the information about the current state of the IoT through a display. The head unit is also configured to re-inquire the current state of the IoT by the first server to update the information about the current state of the IoT stored in the first server and compare the information about the current state of the IoT displayed through the display with the information about the current state of the IoT device updated in the first server with each other to determine match the information about the current stat of the IoT displayed through the display and the information about the current state of the IoT device updated in the first server. The head unit is also configured to, upon the information about the current stat of the IoT displayed through the display does not matching the information about the current state of the IoT device updated in the first server, display, through the display, the information about the current state of the IoT device updated in the first server.

The first server may be a server operated by a manufacturer of the vehicle to enable the IoT device at a remote site to be controlled from the vehicle.

The first server may communicate with the IoT device through a second server and a third server.

The second server may be a server operated by an IoT service company to provide an IoT service through the IoT device and the third server may be a server operated by a manufacturer of the IoT device to provide content related to the IoT.

The request for inquiring the current state of the IoT device may be transmitted through the first server and the second server to the third server such that the inquiring of the current state of the IoT device is performed. A result of inquiring the current state of the IoT device may be transmitted to the first server through the third server and the second server and is stored in the first server.

According to another aspect of the disclosure, a system of controlling a vehicle is provided. The system includes a head unit configured to perform a remote control on an Internet of Things (IoT) device at a remote site from a vehicle. The system also includes a display configured to display a user interface and information related to the remote control of the IoT device. The head unit is configured to, in response to generation of a command for remotely controlling the IoT device located at the remote site from the vehicle, transmit the command through a first server to a second server. The head unit is also configured to, in response to success of the transmission of the command from the first server to the second server, assume that command has been executed based on the success of the transmission of the command before checking a result of executing the command in practice in the IoT device and display that the command has been executed on the display in advance. The head unit is also configured to, in response to transmission of the command from the second server to the IoT device and reception a result of executing the command in the IoT device, identify whether the command has been executed in the IoT device. The head unit is also configured to, in response to the command having not been executed in the IoT device, correctively indicate that the command has not been executed, and display the corrected result on the display of the vehicle.

The first server may be a server operated by a manufacturer of the vehicle to enable the IoT device at a remote site to be controlled from the vehicle.

The first server may communicate with the IoT device through the second server and a third server.

The second server may be a server operated by an IoT service company to provide an IoT service through the IoT device and the third server may be a server operated by a manufacturer of the IoT device to provide content related to the IoT.

The command may be transmitted through the first server and the second server and through the third server to the IOT device such that control corresponding to the command is performed. A result of executing the command in the IOT device may be transmitted to the vehicle through the third server, the second server, and the first server.

BRIEF DESCRIPTION OF THE DRAWINGS

These and/or other aspects of the disclosure should become apparent and more readily appreciated from the following description of the embodiments, taken in conjunction with the accompanying drawings of which.

DETAILED DESCRIPTION

Figure 1:
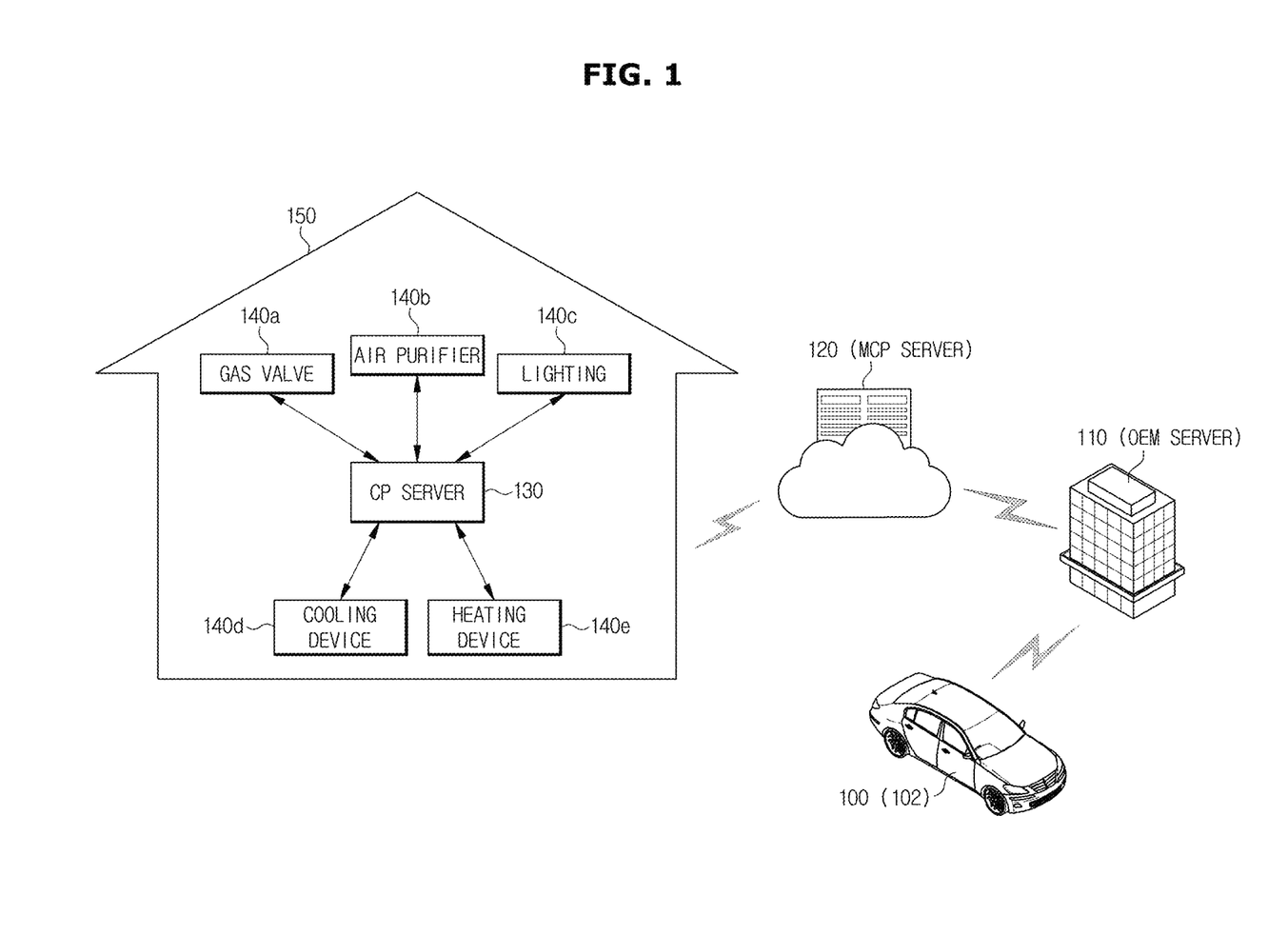
FIG. 1 is a diagram illustrating a configuration of a Car-to-Home service according to an embodiment of the present disclosure.

When a component, device, element, or the like of the present disclosure is described as having a purpose or performing an operation, function, or the like, the component, device, or element should be considered herein as being "configured to" meet that purpose or to perform that operation or function. FIG. 1 is a diagram illustrating a configuration of a Car-to-Home service according to an embodiment of the present disclosure.

Referring to FIG. 1, a Car-to-Home service according to an embodiment of the present disclosure is provided to enable wireless communication between a vehicle 100, an original equipment manufacturer (OEM) server 110, a master content provider (MCP) server 120, and a content provider (CP) server 130.

The vehicle 100 communicates with the OEM server 110 via a head unit 102. The head unit 102 of the vehicle 100 displays a user interface related to a Car-to-Home service through a display and allows a user to use the Car-to-Home service through manipulation of the user interface displayed on the display of the head unit 102. For example, when a user in the vehicle 100 desires to turn on a cooling device 140d before arriving at a home 150, the user may call a Car-to-Home user interface through the display of the head unit 102 of the vehicle 100 and manipulate the Car-to-Home service to turn on the cooling device 140d. The display may be provided integrally with the head unit 102 or may be provided separately from the head unit 102.

The OEM server 110 is a server operated by a manufacturer of the vehicle 100 for a Car-to-Home service and is named based on referring a vehicle manufacturer as an OEM. The OEM server 110 may also be referred to as an 'Automotive Manufacturer Server'. Such an OEM server 110 receives a Car-to-Home command generated from the head unit 102 of the vehicle 100 and transmits the command to the MCP server 120. In addition, the OEM server 110 may transmit a result of processing the Car-to-Home command received from the MCP server 120 to the head unit 102 of the vehicle 100. The Car-to-Home command may include a current state inquiry request for inquiring the current state of the Internet of Things (IoT) device 140.

The MCP server 120 is a server operated by a home IoT service provider that provides an IoT service used in the home, in other words, a home IoT service to provide home IoT services. To receive multiple home IoT services, a user does not need to generate accounts for multiple home IoT service providers, but simply subscribes to a MCP service through a single account so that the user may use the home IoT services of multiple subordinate CPs subscribed to the MCP. The MCP server 120 delivers information about each of the IoT devices registered by the user to the OEM server 110. In addition, the MCP server 120 transmits a Car-to-Home command received through the OEM server 110 to the IoT device (e.g., an IoT device 140 in FIG. 1) linked to the MCP server 120 and transmits a result of executing the command in the IoT device to the OEM server 110. The OEM server 110 and the MCP server 120 may identify a user through matching (registration) between a Car-to-Home service account of the user and an IoT service account of the user.

The CP server 130 is a server operated by each home IoT manufacturer that manufactures and sells the IoT device 140. For example, a home IoT manufacturer that manufactures and sells an air purifier 140b provides home IoT content related to the air purifier 140b to the user and operates the CP server 130 to provide the home IoT content. Accordingly, in FIG. 1, a plurality of CP servers 130 may exist according to manufacturers of each IoT device 140 provided at home 150. In FIG. 1, only one CP server 130 is illustrated.

In FIG. 1, a MCP providing the home IoT service acquires state information of the IoT device through the CP server 130 of a CP that manufactures/sells the IoT device and transmits the acquired state information to the head unit 102 of the vehicle 100 through the OEM server 110.

In FIG. 1, as the IoT device 140, a gas valve 140a, an air purifier 140b, a lighting 140c, a cooling device 140d, and a heating device 140e are exemplified. However, the IoT device 140 is not limited to those shown in FIG. 1 and application thereof may be extended to all types of devices that may be controlled through a Car-to-Home service.

Figure 2:
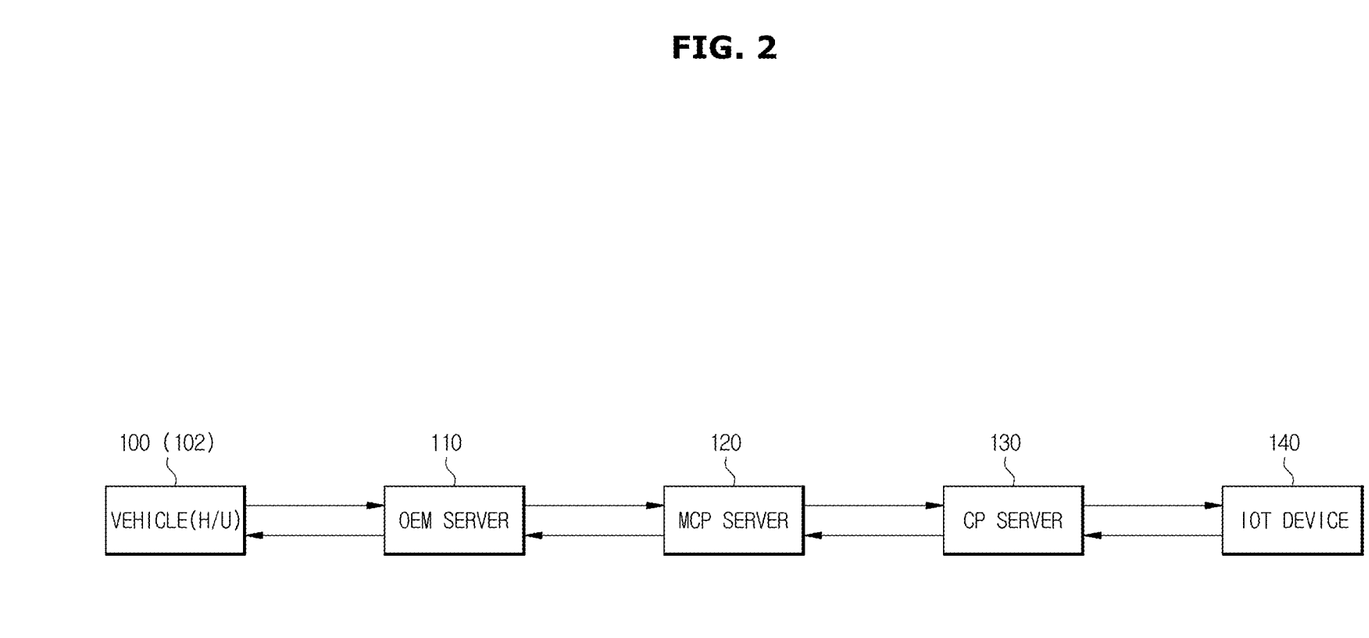
FIG. 2 is a diagram schematically illustrating components of the Car-to-Home service shown in FIG. 1.

FIG. 2 is a diagram schematically illustrating components of the Car-to-Home service shown in FIG. 1.

Referring to FIG. 2, a Car-to-Home command generated from the head unit 102 of the vehicle 100 is transmitted to the IoT device 140 through the OEM server 110, the MCP server 120, and the CP server 130. After receiving the Car-to-Home command, the IoT device 140 executes the command and transmits a result of executing the command to the head unit 102 of the vehicle 100 through the CP server 130, the MCP server 120, and the OEM server 110.

However, when the Car-to-Home command and the result of executing the command are transmitted in the route described above, it takes a long time to transmit the information, so that the user needs to wait a long time until checking the result after generation of the Car-to-Home command. In order to shorten the time taken to check the result after the generation of the Car-to-Home command, a vehicle according to the embodiment of the present disclosure and a method of controlling the same may perform processing and transmission of information as shown in FIGS. 3 and 4 described below.

Figure 3:
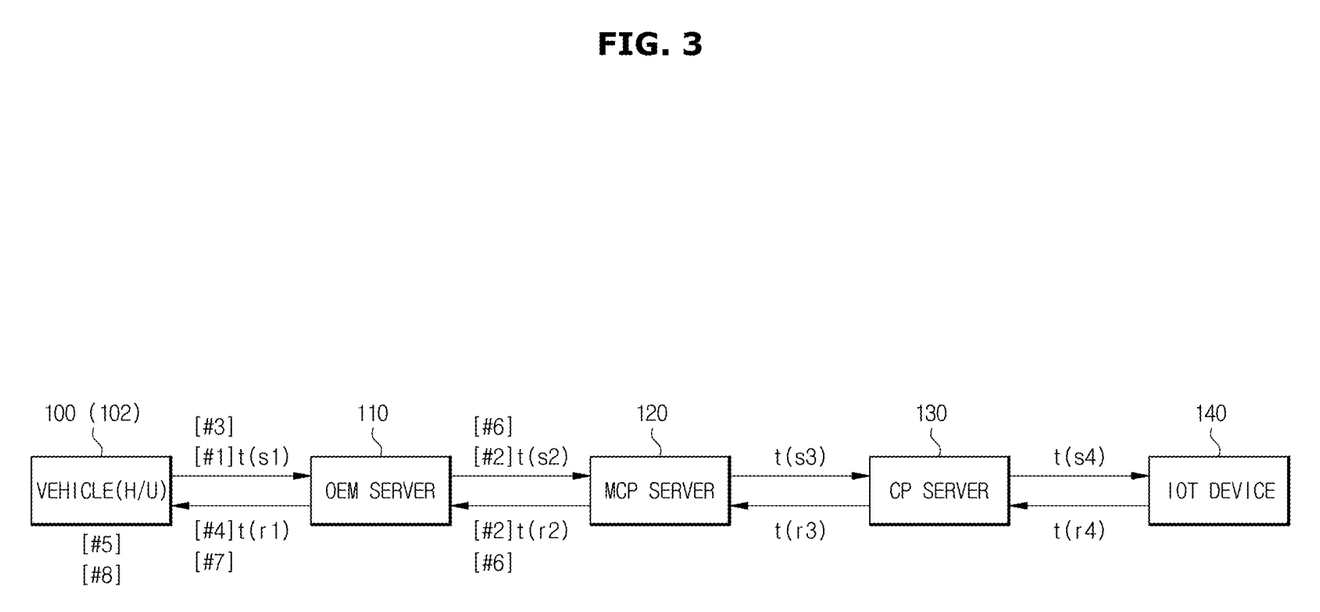
FIG. 3 is a diagram illustrating a process of inquiring a current state of an Internet of Things (IoT) device in a Car-to-Home service of a vehicle according to an embodiment of the present disclosure.
Figure 4:
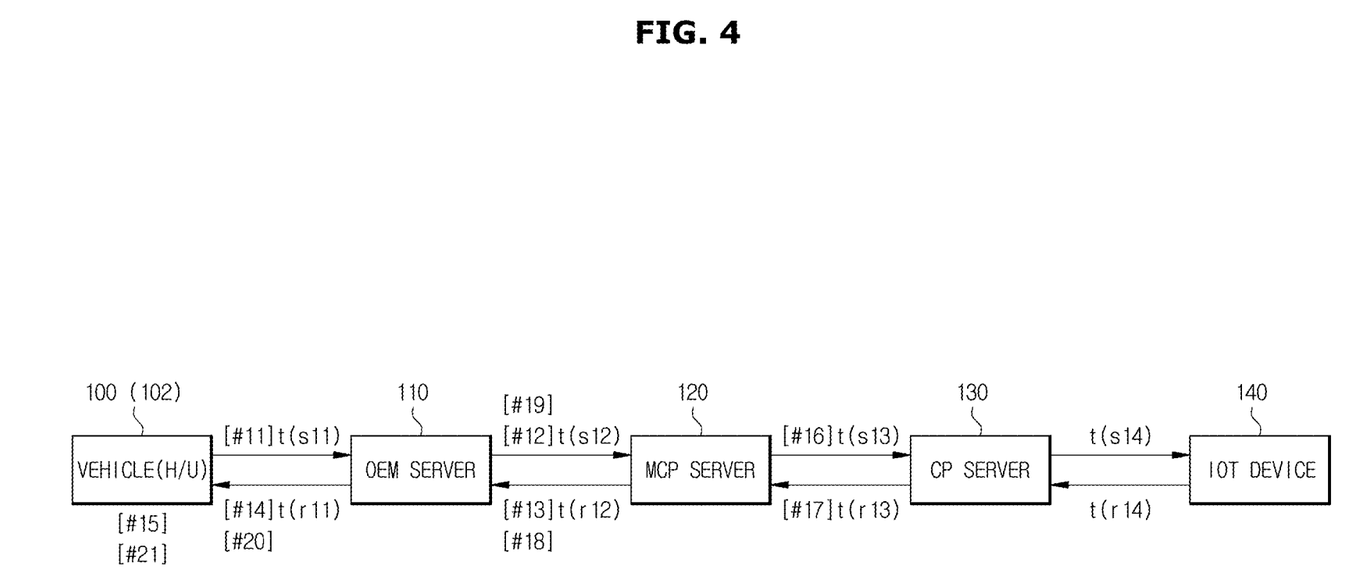
FIG. 4 is a diagram illustrating a process of controlling an IoT device in a Car-to-Home service of a vehicle according to an embodiment of the present disclosure.

FIG. 3 is a diagram illustrating a process of inquiring a current state of an IoT device in a Car-to-Home service of a vehicle according to an embodiment of the present disclosure. In FIG. 3, '[#n]' denotes division of information processing tasks, 't(sn)' denotes an information transmission time (transmission time) according to the task, and 't(rn)' denotes an information reception time according to the task (reception time).

In [#1], the head unit 102 of the vehicle 100 transmits a current position, a destination, and a stopover (if needed) of the vehicle 100 to the OEM server 110 from an engine starting time, for the following cases.

Transmission of the current position, the destination, and the stopover (if needed) whenever the engine of the vehicle 100 is turned on or turned off.

Transmission of the current position, the destination, and the stopover (if needed) whenever the destination/stopover of the vehicle 100 is set or changed Transmission of the current position, the destination, and the stopover (if needed) whenever the administrative area of the current position of the vehicle 100 is changed.

In [#2], the OEM server 110 inquires the current state of the IoT device 140 through the MCP server 120 at a preset state-inquiring cycle from when the engine of the vehicle 100 is turned on to when the engine is turned off. The OEM server 110 also updates information about the current state of the IoT device 140. The preset state-inquiring cycle for inquiring the current state of the IoT device 140 may be determined as follows. When the current position of the vehicle 100 belongs to the same administrative area of the current position of the IoT device 140, the state-inquiring cycle may be set to be increased such that the state inquiring interval becomes shorter than a default value (e.g., once/1 min). In addition, even when the destination/stopover of the vehicle 100 belongs to the same administrative area of the current position of the IoT device 140, the state-inquiring cycle may be set to be increased such that the state inquiring interval become shorter than the default value (e.g., once/1 min). In other cases, the state-inquiring cycle may be set to be decreased such that the state inquiring interval becomes longer than the default value (e.g., once/10 min). When the current position of the vehicle 100 is the same as the current position of the IoT device 140 or the destination/stopover of the vehicle 100 is the same as the current position of the IoT device 140, the state-inquiring cycle is set upward to have a shorter inquiry interval as described above, so that a request for state information may be more rapidly responded.

As described above, while the information about the current state of the IoT device 140 is stored in the OEM server 110 through the processes of [#1] and [#2], when a request to inquire the current state of the IoT device 140 linked to the head unit 102 of the vehicle 100 is generated in [#3], the OEM server 110 transmits the information about the current state of the IoT device 140 currently stored in the OEM server 100 to the head unit 102 of the vehicle 100 in [#4]. In [#5], the head unit 102 of the vehicle 100 displays the information about the current state of the IoT device 140 received from the OEM server 110 to the user through a display.

Although the OEM server 110 has already transmitted the information about the current state of the IoT device 140 currently stored in the OEM server 110 to the head unit 102 of the vehicle 100 in [#4], the OEM server 110 inquires the current state of the IoT device 140 once more from the MCP server 120 and updates the result in [#6]. In [#7], if the information of the current state of the IoT device transmitted in [#4] does not match the information about the current state of the IoT device 140 updated in [#6], the OEM server 110 transmits the new information about the current state of the IoT device 140 updated in [#6] to the head unit 102 of the vehicle 100. The head unit 102 of the vehicle 100 displays, through the display, the new information about the current state of the IoT device 140 received in [#7], so that the user may identify more up-to-date current state information of the IoT device 140.

As such, in the embodiment of the present disclosure, when inquiring the state information of the IoT device 140, the information about the current state of the IoT device 140 stored in the OEM server 110 in [#4] is first displayed through the display of the head unit 102, and if needed, the information about the current state is updated to more up-to-date current state information of the IoT device 140 and displayed through the display of the head unit 102 in [#7]. This may shorten the waiting time of the user in the vehicle 100 by shortening the time taken to display the information about the current state of the IoT device 140 to the user in the vehicle 100.

For example, if the current state of the IoT device 140 is directly inquired and displayed through the display by only the processes of [#6], [#7], and [#8] without performing the processes of [#3] and [#4], the time taken for the user to receive the information about the current state of the IoT device 140 may be equal to $t(s1)+t(s2)+t(s3)+t(s4)+t(r4)+t(r3)+t(r2)+t(r1)$ shown in FIG. 3.

Different from the above, the embodiment of the present disclosure is provided in which the information about the current state of the IoT device 140 already stored in the OEM server 110 is first displayed through the processes of [#3] and [#4], so that the user may receive the information about the current state of the IoT device 140 within a relatively very short time of $t(s1)+t(r1)$. Thus, according to the embodiment of the present disclosure, the user may have a waiting time $t(s1)+t(r1)$ that is significantly shorter than the existing waiting time $t(s1)+t(s2)+t(s3)+t(s4)+t(r4)+t(r3)+t(r2)+t(r1)$.

In the present disclosure, even if the information about the current state is displayed in [#5] and then is replaced by the more up-to-date current state information of the IoT device 140 and displayed in [#8], since the user has primarily received the information about the current state of the IoT device 140 in [#4], the user may feel as if waiting for a short time compared to a case of waiting until the point of [#8].

FIG. 4 is a diagram illustrating a process of controlling an IoT device in a Car-to-Home service of a vehicle according to an embodiment of the present disclosure. In FIG. 4, '[#n]' denotes division of information processing tasks, 't(sn)' denotes an information transmission time (transmission time) according to the task, and 't(rn)' denotes an information reception time according to the task (reception time).

In [#11], a user in the vehicle 100 may call a user interface of the head unit 102 of the vehicle 100 and manipulate the user interface to generate a Car-to-Home command to control one of the IoT devices 140 in the home 150.

The Car-to-Home command generated from the head unit 102 of the vehicle 100 is transmitted to the MCP server 120 through the OEM server 110 in [#12].

The MCP server 120 transmits the Car-to-Home command received from the OEM server 110 to the CP server 130 to request control corresponding to the Car-to-Home command, and if the 'control request' is performed according to a predetermined protocol, notifies the OEM server 110 that the control request has been successfully performed in [#13].

In [#14], the OEM server 110 transmits to the head unit 102 of the vehicle 100 information indicating that the corresponding car-to-Home command has been normally executed. The head unit 102 displays through the display that the corresponding Car-to-Home command has been successfully performed in [#15] so that the user may identify the result of executing the Car-to-Home command.

However, in the processes from [#11] to [#14], the success of execution of the Car-to-Home command is merely assumed based on the normal transmission of the control request according to the Car-to-Home command from the MCP server 120 to the CP server 130 and indicated through the display, rather than checking whether the corresponding Car-to-Home command has been successfully executed in practice.

During the processes of [#14] and [#15] in the head unit 102 of the vehicle 100, the MCP server 120 transmits the corresponding Car-to-Home command to the CP server 130 in [#16] so that control corresponding to the Car-to-Home command is performed in the IoT device 140 in the form of background control. When the Car-to-Home command is successfully executed in the IoT device 140, the CP server 130 transmits a result of the control of the IoT device 140 and information about the current state of the IoT device 140 to the MCP server 120 in [#17]. The MCP server 120 transmits the control result and the current state information of the IoT device 140 to the OEM server 110 in [#18].

In [#19], the OEM server 110, if the Car-to-Home command generated in [#11] does not match the control result and the current state information of [#18] (i.e., in the case of a control failure), repeatedly performs the process of #12 a predetermined number of times until the control succeeds. If the control is not successful even after a predetermined number of repetitions, the OEM server 110 notifies the control failure to the head unit 102 of the vehicle 100 in [#20] and the head unit 102 correctively indicates the control failure through the display in [#21].

If the control according to the Car-to-Home command generated in [#11] fails, the previous indication of the success is corrected and the failure is indicated in [#20] and [#21]. Conversely, if the control according to the Car-to-Home command generated in [#11] succeeds in practice, there is no need to indicate the success of the Car-to-Home command again because the success of the control has been already indicted in [#15] through the display of the head unit 102. Accordingly, since the result of the control according to the Car-to-Home command generated in [#11] is primarily indicated in the processes [#11] to [#15], the result of executing the Car-to-Home command is more rapidly exposed to the user compared to a case in which the result is indicated through the processes [#16] to [#21] after confirming the success in practice. This may shorten the waiting time of the user in the vehicle 100 by shortening the time taken to display the result of executing the Car-to-Home command in the IoT device 140 to the user.

For example, if the result of executing the Car-to-Home command in the IoT device 140 is displayed on the display only through the processes of [#16] to [#21] without through the processes of [#13] and [#14], the time taken for the user to receive the result of executing the Car-to-Home command through the display of the head unit 102 may be equal to t(s11)+t(s12)+t(s13)+t(s14)+t(r14)+t(r13)+t(r12)+t(r11) shown in FIG. 4.

Different from the above, in the embodiment of the present disclosure, it is assumed that the Car-to-Home command has succeed only based on success of transmission of the Car-to-Home command from the MCP server 120 to the CP server 130 and information indicating the success is preliminarily indicated through the processes [#13] and [#14], so that the user may identify the success of the Car-to-Home command within a relatively very short time of t(s11)+t(s12)+t(r12)+t(r11). Thus, according the embodiment of the present disclosure, it can be seen that the waiting time of the user t(s11)+t(s12)+t(r12)+t(r11) is significantly shorter than the existing waiting time of t(s11)+t(s12)+t(s13)+t(s14)+t(r14)+t(r31)+t(r12)+t(r11).

In the present disclosure as described above, even if a success of execution of the Car-to-Home command is indicated in [#15] and then is replaced by a failure of execution of the Car-to-Home command and indicated in [#21], since the user has primarily received whether the Car-to-Home command is successful in [#15], the user may feel as if waiting a relatively short time compared to a case of waiting until the point [#21].

As is apparent from the above, the present disclosure may shorten the waiting time taken for a user to receive a result of a command (a request) when implementing a Car-to-Home service that performs communication through a plurality of servers.

The above description of the present disclosure is for illustrative purposes, and those having ordinary skill in the art should appreciate that other specific modifications may be easily made without departing from the technical spirit or essential features of the present disclosure. Therefore, the above embodiments should be regarded as illustrative rather than limitative in all aspects. The scope of the disclosure is not to be limited by the detailed description set forth above, but by the accompanying claims of the present disclosure. It should also be understood that all changes or modifications derived from the definitions and scope of the claims and their equivalents fall within the scope of the present disclosure.

What is claimed is:

1. A method of performing a control from a vehicle, the method comprising:
   inquiring, by a first server, a current-cycle state of an Internet of Things (IoT) device that is linked to enable remote control from a vehicle and configured to store the inquired current-cycle state of the IoT device;
   upon generation of a request for inquiring the current-cycle state of the IoT device from the vehicle, fetching information about the current-cycle state of the IoT stored in the first server and displaying the fetched information about the current-cycle state of the IoT through a display, wherein the information about the current-cycle state of the IoT stored in the first server is pre-stored before the generation of the request for inquiring the current-cycle state of the IoT device from the vehicle;
   re-inquiring the current-cycle state of the IoT to update the information about the current-cycle state of the IoT stored in the first server; and
   upon the information about the current-cycle state of the IoT displayed through the display not matching the information about the current-cycle state of the IoT device updated in the first server, displaying the information about the current-cycle state of the IoT device updated in the first server through the display,
   wherein the first server is configured to, at a preset cycle during each of state-inquiring cycles, receive the current-cycle state of the IoT device from a second server and update the current-cycle state of the IoT device, and
   wherein the first server is configured to set a period of the preset cycle based on a position of the vehicle and a position of the IoT device.

2. The method of claim 1, wherein the first server is a server operated by a manufacturer of the vehicle to enable the IoT device at a remote site to be controlled from the vehicle.

3. The method of claim 2, wherein the first server communicates with the IoT device through the second server and a third server.

4. The method of claim 3, wherein the second server is a server operated by an IoT service company to provide an IoT service through the IoT device; and
   wherein the third server is a server operated by a manufacturer of the IoT device to provide content related to the IoT.

5. The method of claim 4, wherein the request for inquiring the current-cycle state of the IoT device is transmitted through the first server and the second server to the third server so that the inquiring of the current-cycle state of the IoT device is performed, and
   wherein a result of inquiring the current-cycle state of the IoT device is transmitted through the third server and the second server to the first server and is stored in the first server.

6. A method of performing a control from a vehicle, the method comprising:
   in response to generation of a command for remotely controlling an Internet of Things (IoT) device located at a remote site from a vehicle, transmitting the command through a first server to a second server, wherein in response to success of the transmission of the command from the first server to the second server, the first server is configured to transmit the success of the transmission of the command to the vehicle, and the second server is configured to transmit the command to a third server configured to transmit the command to the IoT device;
   in response to receiving the success of the transmission of the command, displaying, by the vehicle, that the command has been executed on a display of the vehicle before the second server receives a result of executing the command from the third server;
   in response to the second server receiving the result of executing the command from the third server, transmitting, by the second server to the first server, the result of executing the command;
   in response to the first server receiving the result of executing the command from the second server, transmitting, by the first server to the vehicle, the result of executing the command; and
   in response to the command having not been executed in the IoT device, by the vehicle, correctively indicating that the command has not been executed and displaying the corrected result on the display of the vehicle,
   wherein the first server is configured to, at a preset cycle, receive a current state of the IOT device from the second server and update the current state of the IOT device, and wherein the first server is configured to set a period of the preset cycle based on a position of the vehicle and a position of the IoT device.

7. The method of claim 6, wherein the first server is a server operated by a manufacturer of the vehicle to enable the IoT device at a remote site to be controlled from the vehicle.

8. The method of claim 7, wherein the first server communicates with the IoT device through the second server and the third server.

9. The method of claim 8, wherein the second server is a server operated by an IoT service company to provide an IoT service through the IoT device; and
wherein the third server is a server operated by a manufacturer of the IoT device to provide content related to the IoT device.

10. The method of claim 9, wherein the command is transmitted through the first server and the second server to the third server such that control corresponding to the command is performed, and
wherein a result of executing the command in the IOT device is transmitted to the vehicle through the third server, the second server, and the first server.

11. A system of performing a control from a vehicle, the system comprising:
a head unit installed in the vehicle, wherein the head unit includes a memory configured to store one or more instructions and includes a processor configured to execute the one or more instructions stored in the memory, wherein the instructions, when executed by the processor, cause the processor to perform a remote control on an Internet of Things (IoT) device at a remote site from the vehicle; and
a display configured to display a user interface and information related to the remote control of the IoT device,
wherein the processor of the head unit is configured to
inquire, through a first server, a current-cycle state of the IoT device that is linked to enable remote control from the vehicle and store the inquired current-cycle state of the IoT device,
upon generation of a request for inquiring the current-cycle state of the IoT device from the vehicle, fetch information about the current-cycle state of the IoT stored in the first server and display the information about the current-cycle state of the IoT through a display, wherein the information about the current-cycle state of the IoT stored in the first server is pre-stored before the generation of the request for inquiring the current-cycle state of the IoT device from the vehicle,
re-inquire the current-cycle state of the IoT by the first server to update the information about the current-cycle state of the IoT stored in the first server and compare the information about the current-cycle state of the IoT displayed through the display with the information about the current-cycle state of the IoT device updated in the first server with each other to determine match the information about the current-cycle state of the IoT displayed through the display and the information about the current-cycle state of the IoT device updated in the first server, and
upon the information about the current-cycle state of the IoT displayed through the display does not matching the information about the current-cycle state of the IoT device updated in the first server, display, through the display, the information about the current-cycle state of the IoT device updated in the first server,
wherein the first server is configured to, at a preset cycle during each of state-inquiring cycles, receive the current-cycle state of the IoT device from a second server and update the current-cycle state of the IoT device,
wherein the first server is configured to set a period of the preset cycle based on a position of the vehicle and a position of the IoT device.

12. The system of claim 11, wherein the first server is a server operated by a manufacturer of the vehicle to enable the IoT device at a remote site to be controlled from the vehicle.

13. The system of claim 12, wherein the first server communicates with the IoT device through the second server and a third server.

14. The system of claim 13, wherein the second server is a server operated by an IoT service company to provide an IoT service through the IoT device; and
wherein the third server is a server operated by a manufacturer of the IoT device to provide content related to the IoT.

15. The system of claim 14, wherein the request for inquiring the current-cycle state of the IoT device is transmitted through the first server and the second server to the third server such that the inquiring of the current-cycle state of the IoT device is performed, and
wherein a result of inquiring the current-cycle state of the IoT device is transmitted to the first server through the third server and the second server and is stored in the first server.

16. A system of performing a control from a vehicle, the system comprising:
a head unit installed in the vehicle, wherein the head unit includes a memory configured to store one or more instructions and includes a processor configured to execute the one or more instructions stored in the memory, wherein the instructions, when executed by the processor, cause the processor to perform a remote control on an Internet of Things (IoT) device at a remote site from the vehicle; and
a display configured to display a user interface and information related to the remote control of the IoT device,
wherein the processor of the head unit is configured to
in response to generation of a command for remotely controlling the IoT device located at the remote site from the vehicle, transmit the command through a first server to a second server, wherein in response to success of the transmission of the command from the first server to the second server, the first server is configured to transmit the success of the transmission of the command to the vehicle, and the second server is configured to transmit the command to a third server configured to transmit the command to the IoT device,
in response to receiving the success of the transmission of the command, display, by the vehicle, that the command has been executed on the display before the second server receives a result of executing the command from the third server, and
in response to the command having not been executed in the IoT device, correctively indicate that the command has not been executed, and display the corrected result on the display of the vehicle, wherein in response to the second server receiving the result of executing the command from the third server, the second server is configured to transmit the result of executing the command to the first server, wherein in response to the first server receiving the result of executing the command from the second server, the first server is configured to transmit the result of executing the command to the vehicle, wherein the first server is configured to, at a preset cycle, receive a current state of the IOT device from the second server and update the current state of the IOT device, and wherein the first server is configured to set a period of the preset cycle based on a position of the vehicle and a position of the IoT device.

17. The system of claim 16, wherein the first server is a server operated by a manufacturer of the vehicle to enable the IoT device at a remote site to be controlled from the vehicle.

18. The system of claim 17, wherein the first server communicates with the IoT device through the second server and a third server.

19. The system of claim 18, wherein the second server is a server operated by an IoT service company to provide an IoT service through the IoT device; and wherein the third server is a server operated by a manufacturer of the IoT device to provide content related to the IoT device.

20. The system of claim 19, wherein the command is transmitted through the first server and the second server and through the third server to the IOT device such that control corresponding to the command is performed.

21. The method of claim 1, the first server is configured to set the period of the preset cycle to be shorter than a predetermined criterion when the position of the vehicle and the position of the IoT device are in a same administrative area.

22. The method of claim 1, the first server is configured to set the period of the preset cycle to be longer than a predetermined criterion when the position of the vehicle and the position of the IoT device are in a different administrative area.

23. The method of claim 1, wherein the first server is configured to set a period of the preset cycle based a destination position or a stopover position of the vehicle and the position of the IoT device.

24. The method of claim 23, the first server is configured to set the period of the preset cycle to be shorter than a predetermined criterion when the destination position or the stopover position of the vehicle and the position of the IoT device are in a same administrative area.

25. The method of claim 23, the first server is configured to set the period of the preset cycle to be longer than a predetermined criterion when the destination position or the stopover position of the vehicle and the position of the IoT device are in a different administrative area.

26. The method of claim 6, the first server is configured to set the period of the preset cycle to be shorter than a predetermined criterion when the position of the vehicle and the position of the IoT device are in a same administrative area.

27. The system of claim 11, the first server is configured to set the period of the preset cycle to be shorter than a predetermined criterion when the position of the vehicle and the position of the IoT device are in a same administrative area.

28. The system of claim 16, the first server is configured to set the period of the preset cycle to be shorter than a predetermined criterion when the position of the vehicle and the position of the IoT device are in a same administrative area.

* * * * *